United States Patent

[11] 3,586,392

| [72] | Inventors | Donald H. Ballard;<br>George K. Farmery, both of Lincoln, England |
|---|---|---|
| [21] | Appl. No. | 816,958 |
| [22] | Filed | Apr. 17, 1969 |
| [45] | Patented | June 22, 1971 |
| [73] | Assignee | Clayton Dewandre Company Limited<br>Lincoln, England |
| [32] | Priority | Apr. 22, 1968 |
| [33] |  | Great Britain |
| [31] |  | 18910/68 |

[54] FLUID OPERATED BRAKING SYSTEMS
4 Claims, 3 Drawing Figs.

[52] U.S. Cl. .................................................. 303/89, 303/54
[51] Int. Cl. .......................................................... B60t 15/00
[50] Field of Search ........................................... 303/52, 54, 9, 13, 28—30, 89, 7

[56] References Cited
UNITED STATES PATENTS

| 3,228,730 | 1/1966 | Schubert | 303/13 X |
| 3,241,888 | 3/1966 | Ternent | 303/9 X |
| 3,314,438 | 4/1967 | Ike | 303/9 X |

*Primary Examiner*—Milton Buchler
*Assistant Examiner*—John J. McLaughlin
*Attorney*—Norris & Bateman

ABSTRACT: In a compressed air operated braking system in which the brake motors are fitted with lock actuators for parking purposes and in which a control member, after moving to effect application of the lock actuators, then moves to exhaust the brake motors, damper means are provided for limiting the rate of movement of the control member when applying the lock actuators to ensure that they are fully applied before the brake motors are exhausted.

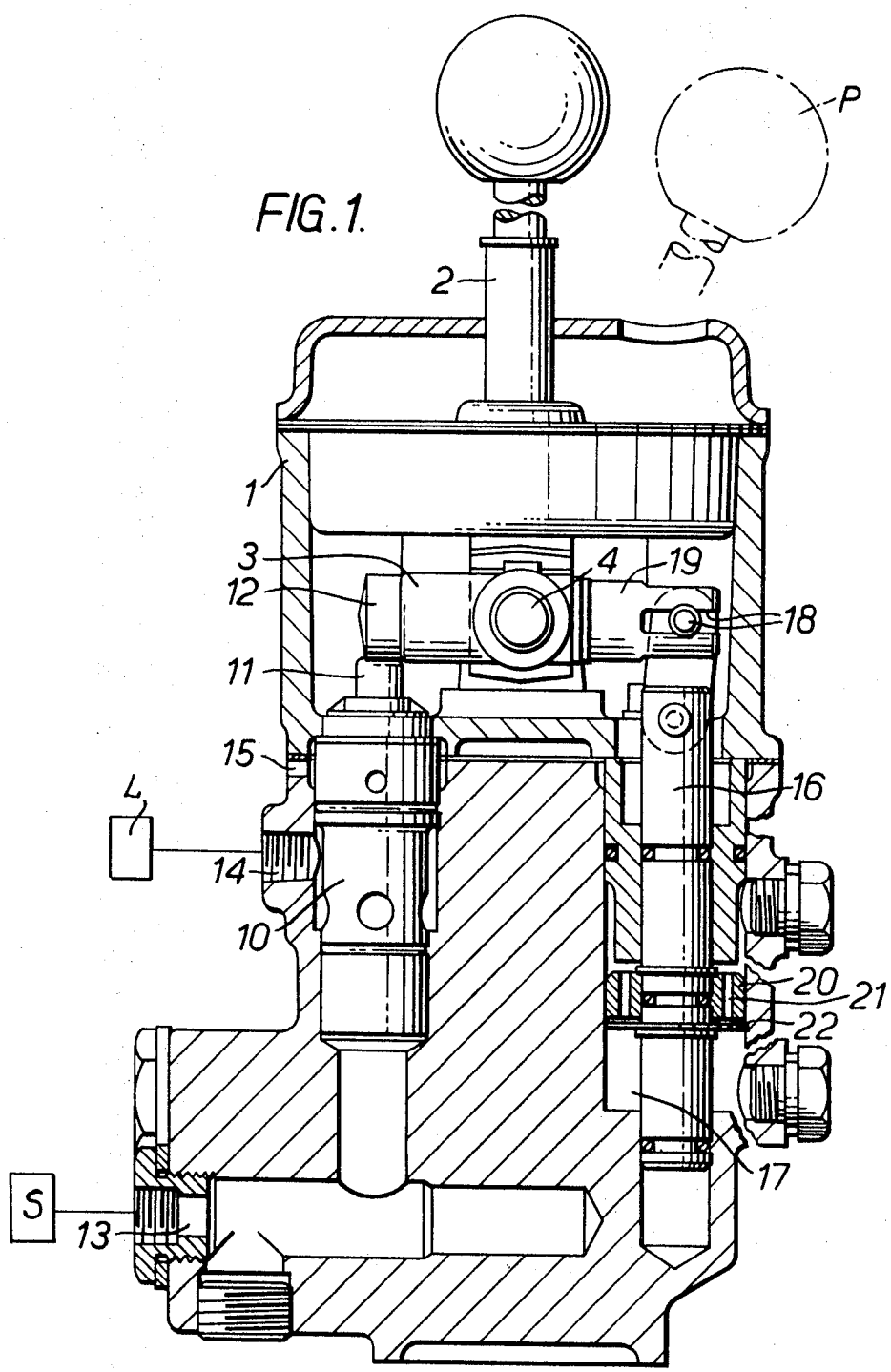

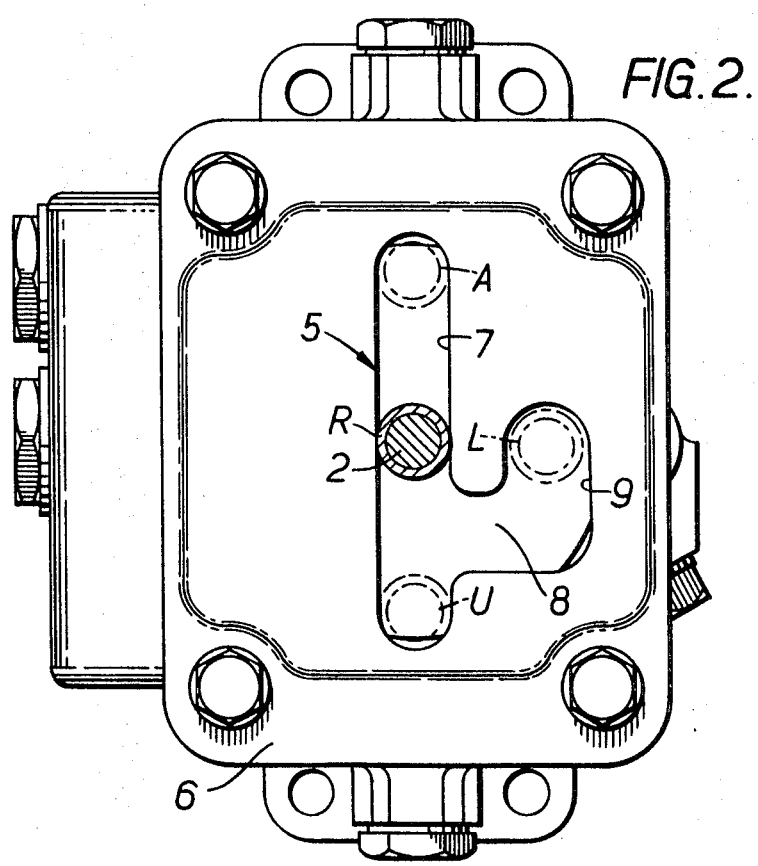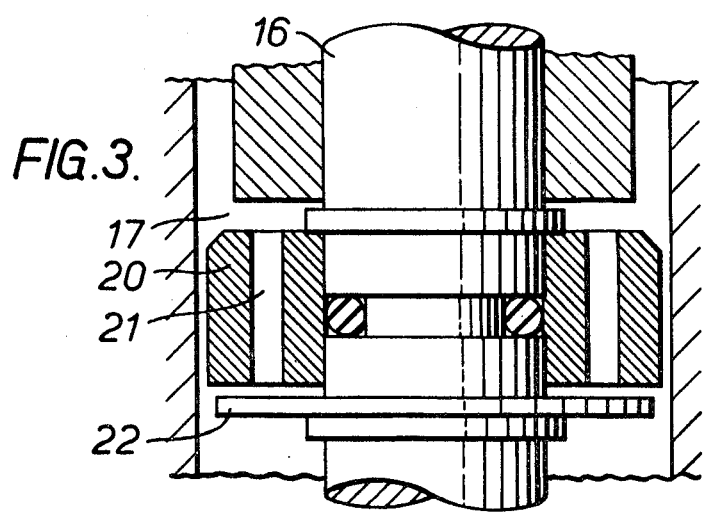

FLUID OPERATED BRAKING SYSTEMS

This invention relates to fluid pressure operated braking systems for motor vehicles and of the kind in which some or all of the brake actuators are also used for parking purposes by providing in association with said brake actuators roller and wedge or similar mechanically operated locking devices, commonly called lock actuators, which devices coact with the output rods of the brake actuators to lock them in the operative or "brakes-on" position. The lock actuator is held in the inoperative position during normal running conditions by the application of reservoir pressure to a pressure ring or equivalent member preventing the wedging action of the rollers upon the rod. With conventional systems of this character it is known to use multidiaphragm-type actuators in conjunction with a control valve unit operable to connect a secondary or emergency line to one of the diaphragm chambers as a secondary or independent means of brake operation, the unit including a hand lever movable in one direction to actuate a graduating valve or valves providing controlled admission of compressed air to the brake actuator, and in another direction to actuate a simple on-off valve to exhaust air from the lock actuator and allow the lock to engage, such action being followed in practice by a reactuation of the first valve to exhaust the brake actuator leaving it locked in the operative position solely by the mechanical locking means. However, with such a system, hereinafter referred to as systems of the kind described, it is essential that the lock actuator be fully exhausted and the locking means fully engaged before the brake actuator is exhausted, and it is the object of the present invention to provide means for ensuring that such sequence of valve operation occurs.

According to the invention this object is achieved by providing damper means operable to limit the rate of movement of the hand lever in its actuation of the on-off valve such that the lock actuator is fully exhausted before the lever can move to exhaust the brake actuator.

Reference will now be made to the accompanying drawings which illustrate by way of example one embodiment of the invention wherein:

FIG. 1 is a sectional side view of the control valve unit,
FIG. 2 is a sectional plan view of FIG. 1, and
FIG. 3 is an enlarged fragmentary view showing details of the damper device.

In the unit shown an assembly of vertically disposed valves is accommodated in a housing 1 and is actuated selectively by a hand lever 2 projecting from the upper end of the housing and supported for pivotal movement in two directions, one perpendicular to the other. In the arrangement illustrated, the lever 2 is pivotally supported in a ring or yoke 3 for oscillatory movement in one plane whilst the yoke is mounted by means of trunnions, one of which is shown at 4, for movement in a second plane at right angles to the first, but any equivalent arrangement may be employed, the lever being controlled in its movements by an h shaped gate 5 formed in the valve cover 6 and through which the lever extends. In the release or "-brakes-off" position, the hand lever is located at the midpoint R of the longer slot 7 of the gate, and movement along the slot towards the point A will actuate a graduating or reactive valve device (not shown) to connect an auxiliary air line to auxiliary diaphragms in the brake actuators. Movement of the hand lever in the opposite direction towards the point U will also actuate a reactive valve device (not shown) for rendering the brake actuators operative although this valve device is used more particularly when unlocking the lock actuators as hereinafter explained. From the gate slot 7 a transfer slot 8 leads into a shorter slot 9 parallel to slot 7, the arrangement being such that to set the brakes for parking the hand lever is moved to and through the transfer slot, the initial movement along slot 7 effecting admission of air to the brake actuators and the movement through the transfer slot effecting actuation of an "on-off" type valve to exhaust air from the lock actuators and render them operative, whilst the final movement of the hand lever along slot 9 to position L exhausts air from the brake actuators, leaving them locked on by the lock actuators. During the return movement of the hand lever to release the brakes, it is momentarily moved to the unlock position U to provide the additional pressure necessary to effect release of the lock actuators.

The "on-off" valve is shown at 10 in FIG. 1, being of a known type and including an operating plunger 11 which is actuated by an abutment 12 on the yoke 3. When the hand lever is in the main slot 7 of the gate, the abutment 12 holds the valve plunger 11 in the depressed position shown in which it connects an inlet port 13 communicating the air supplies to an outlet port 14 connected to a lock actuator brake actuator L having a pressure ring, but when the hand lever is moved through transfer slot 8 it rocks to the angular position P indicated in chain lines and in so doing permits the valve plunger 11 to rise to a position in which it effects closure of the inlet port connection and connects the outlet port 14 to an exhaust 15 whereby the lock actuators are rendered operative. Preferably, the brake actuator L may be of the type disclosed in U.S. Pat. No. 3,453,030 issued July 1, 1969.

To control the rate of movement of the hand lever through the transfer slot 8 a hydraulic damper is used. This device consists of a plunger 16 guided for axial movement and extending through a chamber 17 formed in the housing and charged with hydraulic fluid, said plunger having a linked pin and slot connection 18 at its upper end with an arm 19 on the yoke 3 such that movements of the hand lever through the transfer slot 8 produce axial reciprocation of the plunger. Located in the chamber 17 is a piston 20 of slightly smaller diameter than the bore of the chamber, the piston being mounted on the plunger 16 and being provided with a series of axially extending passages 21. Also mounted on the plunger at the underside of the piston is a flexible diaphragm 22. Thus when the plunger is moved downwards, corresponding to a movement of the hand lever 2 towards the park position P, the diaphragm closes up against the piston, seals off the passages 21 and the precisely controlled clearance between the piston and the chamber wall determines the rate of flow of fluid passed the piston and thereby the rate of movement of the hand lever. On the return stroke, the diaphragm moves away from the piston sufficient to uncover the passages 21 and thereby permit unrestricted flow of fluid passed the piston and so unrestricted movement of the hand lever.

It will be understood that the hydraulic damper above described may be substituted by any equivalent damping device, for example, a damper of the moving vane type or of the friction type.

We claim:

1. In a fluid pressure braking system, means defining a passage adapted to be connected to a source of fluid pressure, a control valve unit in said passage, a movably mounted manual lever adapted for displacement in a predetermined direction between a first position where it effects a first brake control function and a second position where it effects a second brake control function, means operably connecting said lever to said valve unit so that when the lever is in said one position said valve unit communicates fluid pressure to a pressure responsive brake lock actuator in the system, and when said lever is moved toward said second position said valve unit blocks said communication and connects said lock actuator to exhaust, and damping means operably connected to said lever for limiting the rate of movement of said lever to said second position so that said lock actuator may be substantially fully exhausted before said lever reaches said second position.

2. In the fluid pressure braking system defined in claim 1, said manual lever being a hand lever, a yoke on which said lever is pivotally mounted, means providing a pivot for said yoke, and means operatively connecting said control valve unit and said damping means to said yoke at opposite sides of said yoke pivot.

3. A braking system as claimed in claim 1, wherein said damping means is constructed to permit uncontrolled movement of the manual lever in the reverse direction.

4. A braking system as claimed in claim 1, wherein the damping means comprises a piston having operative connection with the manual lever and displaceable in a chamber charged with hydraulic fluid, said piston having axial passages therein and an external diameter such that a controlled clearance is provided between the piston and the chamber wall, and a flexible diaphragm at one side of the piston operable to close off the passages when the piston moves in one direction and to permit unrestricted fluid flow through the passages when the piston moves in the opposite direction.